(12) United States Patent
Supino

(10) Patent No.: US 6,490,237 B1
(45) Date of Patent: Dec. 3, 2002

(54) FUZZY INFERENCE SYSTEM AND METHOD FOR OPTICAL DISC DISCRIMINATION

(75) Inventor: Lou Supino, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 65 days.

(21) Appl. No.: 09/853,724

(22) Filed: May 14, 2001

(51) Int. Cl.[7] .................................................. G11B 7/00
(52) U.S. Cl. .................. 369/59.1; 369/53.11; 369/59.22
(58) Field of Search ............................ 369/47.1, 47.11, 369/47.15, 53.1, 53.23, 59.1, 59.13, 59.22, 59.23

(56) References Cited

U.S. PATENT DOCUMENTS

| | | | |
|---|---|---|---|
| 5,289,451 A | 2/1994 | Ashinuma ..................... 369/58 |
| 5,452,277 A | * 9/1995 | Bajorek et al. .......... 369/53.18 |
| 5,745,461 A | 4/1998 | Kawasaki ..................... 369/58 |
| 5,841,604 A | 11/1998 | Supino ..................... 360/73.03 |
| 5,909,419 A | 6/1999 | Kamiyama ..................... 369/58 |
| 5,914,922 A | 6/1999 | Supino et al. ........... 369/44.28 |
| 5,956,304 A | 9/1999 | Supino et al. ........... 369/44.34 |
| 5,966,357 A | 10/1999 | Ryoo ........................... 369/58 |
| 5,982,721 A | 11/1999 | Supino et al. ........... 369/44.28 |
| 6,111,832 A | 8/2000 | Tsuchiya et al. ............... 369/54 |
| 6,137,758 A | 10/2000 | Nemoto et al. ................ 369/58 |
| 6,141,303 A | 10/2000 | Supino et al. ........... 369/44.28 |
| 6,141,307 A | 10/2000 | Yoshioka ..................... 369/58 |
| 6,185,467 B1 | 2/2001 | Romano et al. ............... 700/28 |
| 6,233,394 B1 | 5/2001 | Jeong et al. ................ 386/126 |

OTHER PUBLICATIONS

Chen, Fu–Chuang and Khalil, Hassan, K., *Adaptive Control of Nonlinear Systems using Neural Networks—A Dead Zone Approach*, IEEE 91CH2939–7.

Cybenko, G., *Approximation by Superpositions of a Singmoidal Function*, Mathematics of Control, Signals and Systems, (1989) 2: 303–314.

Author Unknown, *Foundations of Fuzzy Logic*, Fuzzy Logi Toolbox User's Guide, undated.

* cited by examiner

Primary Examiner—Muhammad Edun
(74) Attorney, Agent, or Firm—Dan Shifrin; Steven Lin; Robert Platt Bell

(57) ABSTRACT

A Fuzzy Inference System (FIS) algorithm capable of discriminating among various disc types including double-layer DVD, single-layer DVD, CD-ROM/CD-Audio, CD-R, and CD-RW is used to identify disc type in an optical drive. This FIS optical disc determination algorithm relies on the physical properties of the reflecting layer of an optical disc, using a DVD and CD photo diode outputs, to discriminate among several disc types. Focus error and quad sum data from both DVD and CD lasers is provided as eight inputs to a nineteen rule Sugeno FIS which outputs a value corresponding to drive type.

72 Claims, 6 Drawing Sheets

| Disk type | Conventional CD vs DVD | FIS | Conventional w/noise CD or DVD | FIS w/noise |
|---|---|---|---|---|
| Cdrom | 100/100 | 100/100 | 94/100 | 100/100 |
| CD-RW | 96/100 | 100/100 | 86/100 | 100/100 |
| CD-R | 100/100 | 100/100 | 100/100 | 100/100 |
| Dvd 1 layer | 99/100 | 100/100 | 99/100 | 100/100 |
| Dvd 2 layer | 97/100 | 100/100 | 89/100 | 100/100 |
| Dvd-R | 98/100 | 100/100 | 93/100 | 100/100 |

Figure 6

FUZZY INFERENCE SYSTEM AND METHOD FOR OPTICAL DISC DISCRIMINATION

FIELD OF THE INVENTION

The present invention relates to an apparatus and method for discriminating among different types of optical discs. In particular, the present invention is directed toward a Fuzzy Inference System (FIS) for discriminating among single and double-layer DVDs and CD-ROMS.

BACKGROUND OF THE INVENTION

Optical storage devices, such as digital versatile discs (DVD) are commonly used for storing large amounts of digital data on a single disc for use in audio/video or computer applications, and the like. To read this recorded data, a servo system focuses a laser beam onto the reflective surface of the disc such that the characteristics of the reflected beam allow the device to determine the recording format of the disc.

Different types of discs may have different refelectivities. CDs and DVDs have different track pitches and require different tracking servo system parameters. A CD, for example, having lower data density, may have a lower track pitch (tracks per inch or tpi) than the higher density DVD. An optical disc drive must be able to identify what type of disc has been loaded in order to properly read the disc. In addition, the optical disc drive should indicate when no media is present (or an unreadable disc has been inserted).

Newer and future optical disc drives may need to accept various types of disc formats such as CD-ROM (including computer CD-ROMs and musical CDs), CD-R (single write CDs), CD-RW (rewritable CDs) and DVDs (Digital Versatile Disc). DVDs may be available in more than one format, including single layer DVDs and double layer DVDs.

Most existing methods can only discriminate among some of the optical disc types, but not all. For example, in conventional DVD/CD players and recorders, prior art discrimination techniques can only discriminate among CD and DVD media. Other techniques may be able to discriminate among only some types of CDs. Moreover, many of these Prior Art techniques rely on a priori knowledge of the electromechanical properties of the laser, photo detector and the media.

For example, Kawasaki, U.S. Pat. No. 5,745,461, issued Apr. 28, 1998, and incorporated herein by reference discloses one technique where, with the optical head at a focus distance, the level of the reproduced signal is measured. CD and CD-Rs have different signal levels, and thus can be discriminated among one another. Ashinuma et al., U.S. Pat. No. 5,289,451, issued Feb. 22, 1994, and incorporated herein by reference, discloses a similar technique.

FIG. 1 is a block diagram illustrating the Prior Art technique of Kawasaki. A reflection measurement device 3 is provided on the opposite side to optical head 2 of optical disc 1 driven by a spindle motor. Reflection measurement device 3 measures reflectivity of back surface of optical disc 1 and may comprise a photo-reflector element. Measured reflectivity is output as reflectivity 101 of the disc surface and is supplied to microcomputer 6.

On the other side of optical disc 1, optical head 2, irradiating a laser light and approaching optical disc 1 for a focus searching operation, outputs a focus sum signal 102, which is also supplied to microcomputer 6 after being converted to a voltage level through focus sum signal converter 4. When optical head 2 is detected by focus sum signal 102 to have reached a focal area, a focus servo mechanism is actuated and optical head 2 is controlled through servo controller 10. After the focus servo mechanism is actuated, tracking signal 103 output from optical head 2 is also supplied to microcomputer 6 after being converted into a voltage level through tracking signal converter 5.

Microcomputer 6 determines whether optical disc 1 is single-sided or double-sided according to reflectivity 101. Microcomputer 6 further estimates the information density of optical disc 1 as well as the number and material of its recording layer(s) by 10 comparing intensity level of the focus sum signal 102 and the peak to peak value of the tracking signal 103 with corresponding values in a reference table. Microcomputer 6 also determines parameter values for initializing and mode-setting of the device, actuating a tracking servo mechanism of optical head 2 through servo controller 10.

Where optical disc 1 is assumed to have ID data recorded thereon from the above estimation, an attempt is made to read the ID data as a final confirmation before initialization or mode-setting. If, instead of ID data, optical disc 2 is estimated to have a wobble signal recorded on its track or to have a characteristic pattern of its synchronous signal in its reproduced signal, they are confirmed for final discrimination.

While the Kawasaki device may be able to discriminate among CDs and CD-Rs based upon signal levels, the apparatus may not be useful for distinguishing among other optical disc types.

Nemoto, U.S. Pat. No. 6,137,758, issued Oct. 24, 2000 and incorporated herein by reference, discloses an Optical Disc Discriminating Apparatus whereby an optical pickup irradiates a main beam and a pair of sub-beams onto an optical disc. Sub-beam pickups receive the sub-beam signals to produce a tracking error signal. The type of optical disc is determined by comparing the tracking error signal to a reference signal. This system requires the use of secondary tracking error beams and appears to be able to discriminate only among CD and DVD types of discs.

Even among those methods that purport to discriminate among all optical disc types, they may not be efficient, accurate, or fast. For example, another Prior Art technique, disclosed in Tsuchiya, U.S. Pat. No. 6,111,832, issued Aug. 29, 2000, and incorporated herein by reference, relies upon difference in thickness between the transparent layer and the reflective layer to discriminate between CD and DVD discs. Unfortunately, a high vertical deviation CD may appear to be a DVD using a method which relies on the difference in the thickness between the transparent layer and the reflective layer.

Another Prior Art technique, disclosed in Ryoo, U.S. Pat. No. 5,996,367, issued Oct. 12, 1999 and incorporated herein by reference, uses amplitudes of quad sum and focus error to discriminate CD verses DVD. The algorithm employed by Ryoo in using the amplitudes of quad sum and focus error to discriminate CD verses DVD may encounter discrimination problems since it relies on absolute amplitudes and offsets of the signals. These signals may vary from disc to disc and from drive type to drive type, and as a result may not produce consistent results in identifying disc types.

Another Prior Art technique, disclosed in Kamiyama, U.S. Pat. No. 5,909,419, issued Jun. 1, 1999 and incorporated herein by reference, relies upon track density difference to distinguish between CD and DVD discs. However, a high radial runout CD may look like a DVD when using an algorithm which relies on the track density difference between CD and DVD. In addition, recently developed high-density CDs are now available with a track density higher than that of prior CDs, but with a lower track density than typical DVDS. The algorithm of Kamiyama may be even less robust in distinguishing such high density CDs from DVDS.

Thus, a need still exists in the art for a technique which can accurately, reliably, quickly, and inexpensively discriminate among all types of optical discs.

Fuzzy logic systems are known in the art. The *Fuzzy Logic Toolbox User's Guide*, Chapter 2, Foundations of Fuzzy Logic, incorporated herein by reference, discloses the basic techniques for applying fuzzy logic. Fuzzy logic may have particular applications to situations where a result of a logical operation is not always a uniform 0 or 1 value. To date, the inventor is unaware of application of fuzzy logic to the problem of disc type determination.

There are two basic types of Fuzzy Inference Systems (FIS) known in the Prior Art; The Sugeno-type and the Mamdani-type. A Sugeno-type first-order system may approximate the Mamdani-type, but require fewer system resources to implement.

SUMMARY OF THE INVENTION

Unlike the aforementioned Prior Art techniques, the present invention applies a cost-effective Fuzzy Inference System (FIS) algorithm which is capable of discriminating among various disc types including double-layer DVD, single-layer DVD, CD-ROM/CD-Audio, CD-R, and CD-RW.

A Fuzzy Inference System (FIS) is provided for the determination of an optical disc type in a DVD or other optical disc drive. This FIS optical disc determination algorithm relies on the physical properties of the reflecting layer of an optical disc, using a DVD and CD photo diode outputs, to discriminate among several disc types.

The FIS optical disc determination algorithm relies on the physical properties of the reflecting layer of an optical disc, using a DVD and CD photo diode outputs, to discriminate among several disc types. Focus error and quad sum data from both DVD and CD lasers is provided as eight inputs to a nineteen rule Sugeno FIS which outputs a value corresponding to drive type.

BRIEF DESCRIPTION OF THE DRAWINGS

FIG. 6 is a table of test results of the present invention as compared to Prior Art disc identification devices.

DETAILED DESCRIPTION OF THE INVENTION

The optical disc determination algorithm relies on the physical properties of the reflecting layer of an optical disc, using a DVD photo diode output and a CD photo diode output, to discriminate among the following disc types: double-layer DVD, single-layer DVD, CD-ROM, CD-R, CD-RW, and No disc present The present invention will be described in the context of a DVD player application which can read the above-identified types of optical discs. However, as may be appreciated by one of ordinary skill in the art, the present invention may also be applied to other types of optical drives where disc discrimination may be required.

In addition, the present invention may be implemented into an integrated circuit for use within an optical disc drive such as a DVD drive or player. Thus, description of the various hardware elements of an optical disc drive is omitted for the sake of clarity, as these hardware elements may comprise Prior Art components and are described in more detail in one or more of the references cited herein and incorporated by reference.

Figure 1:
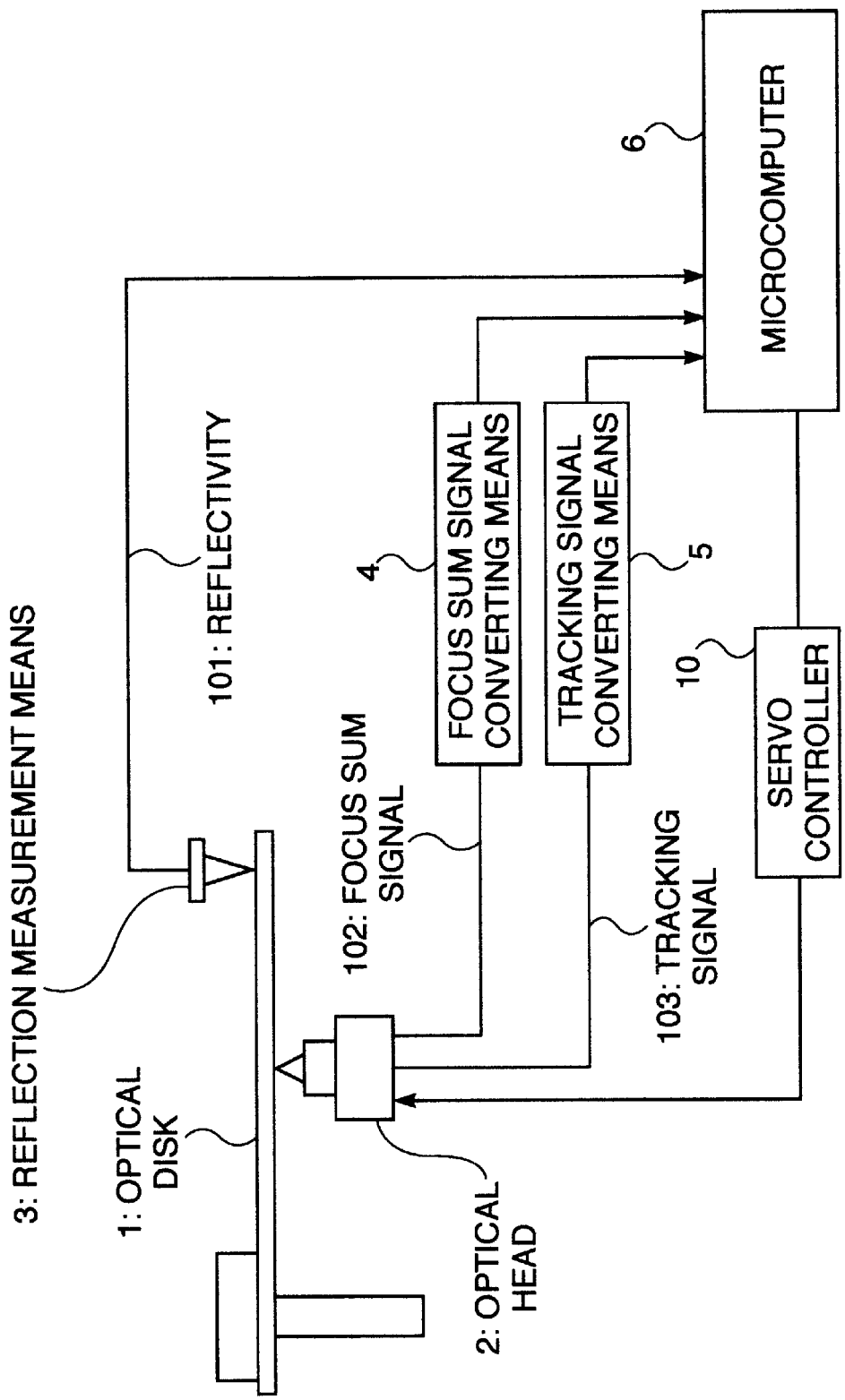
FIG. 1 is a block diagram illustrating the Prior Art technique of Kawasaki.
Figure 2:
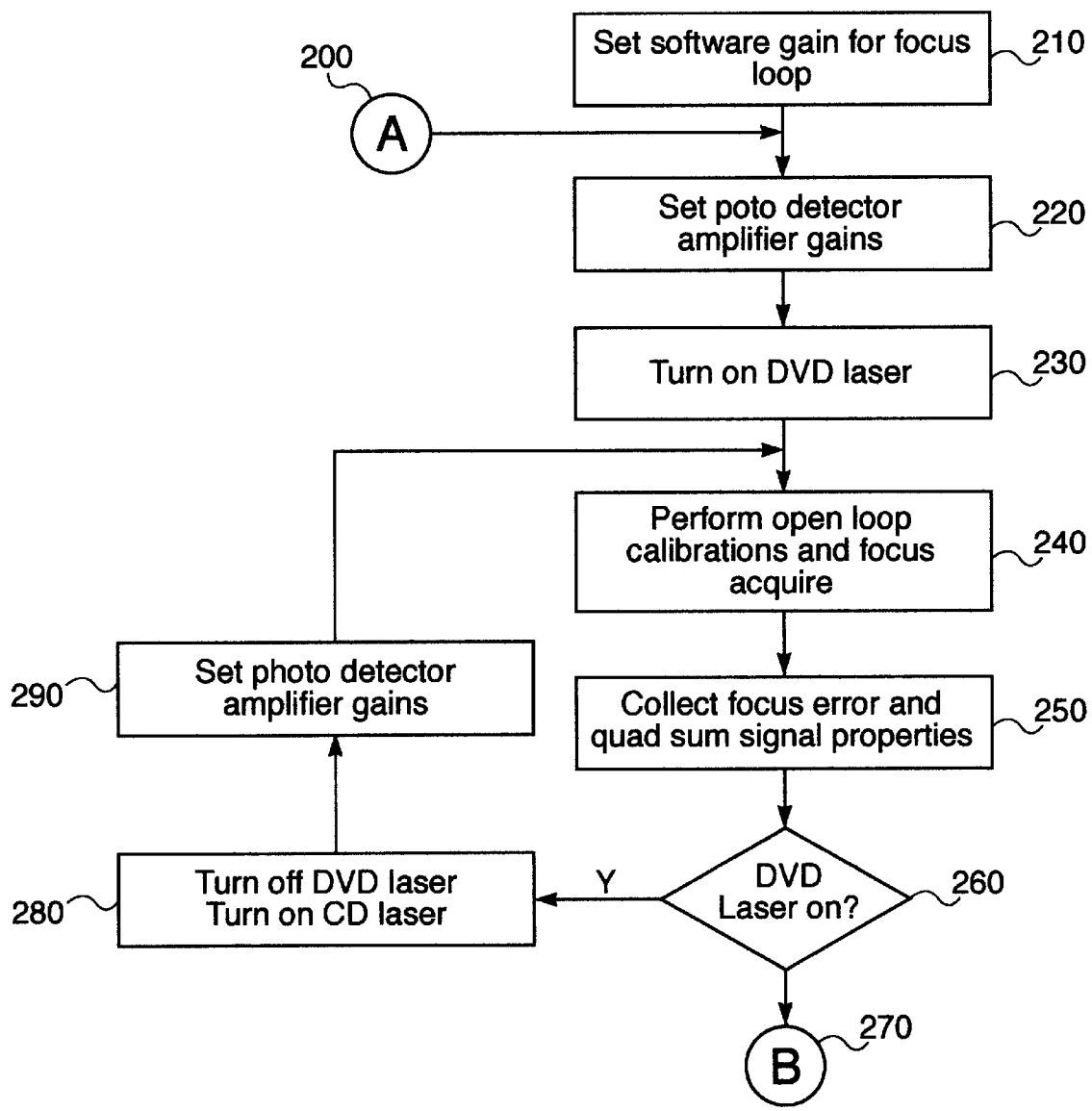
FIG. 2 is a block diagram of a first portion of the disc determination algorithm of the present invention.

The disc determination algorithm of the present invention is set forth in more detail as computer code presented in the Appendix of the present application. Referring to FIG. 2, in steps 210 and 220, the disc determination algorithm sets the initial hardware (step 220) and software gains (step 210) for the laser focus loop. Hardware gains may include initial multiplier values based upon particular disc hardware characteristics. Software gains may include multiplier values based upon software response.

In step 230, the DVD (or other optical disc drive type) laser is activated. In step 240, the servo control system is commanded to perform several open loop calibrations as part of the focus acquire process. In step 250, the focus error and quad sum signals are sanity checked before they are averaged and saved in a usable form for the actual disc determination as described below in connection with FIG. 3.

Focus error signal data represents the error value in laser focus, as is known in the art. Such focus error data may be typically output by a Prior Art optical drive. Quad sum signals as discussed in more detail in Supino et al., U.S. Pat. No. 6,141,303, issued Oct. 31, 2000 and incorporated herein by reference. A typical photodiode detector in an optical drive may comprise four areas or quadrants receiving reflected laser light. Quad sum signals represent the sum of signals generated by these four quadrants of the photo detector.

The process of step 250 may first be carried out for the DVD laser and then for the CD laser in the optical drive. Most DVD type drives may employ two lasers, one for DVD (single and double layer) and one for CD audio, CD-ROM, CD-RW and CD-R or the like. Other types of drives have attempted to use a single laser with limited success. The present invention may be employed advantageously in either type of drive. However, in the preferred embodiment as illustrated herein, the present invention is applied to a two-laser (DVD and CD) drive system.

In step 260, a determination is made to see whether the focus loop has been performed for the DVD or CD laser. If DVD, processing proceeds to step 280 where the DVD laser is turned off and the CD laser activated. In step 290, the photo detector amplifier gains are reset to CD laser values, and the open loop calibrations and focus and quad sum data acquire step 250 is repeated. However, this time, in step 260, processing passes to point B 270, as both DVD and CD focus and quad sum data have been acquired.

Figure 3:
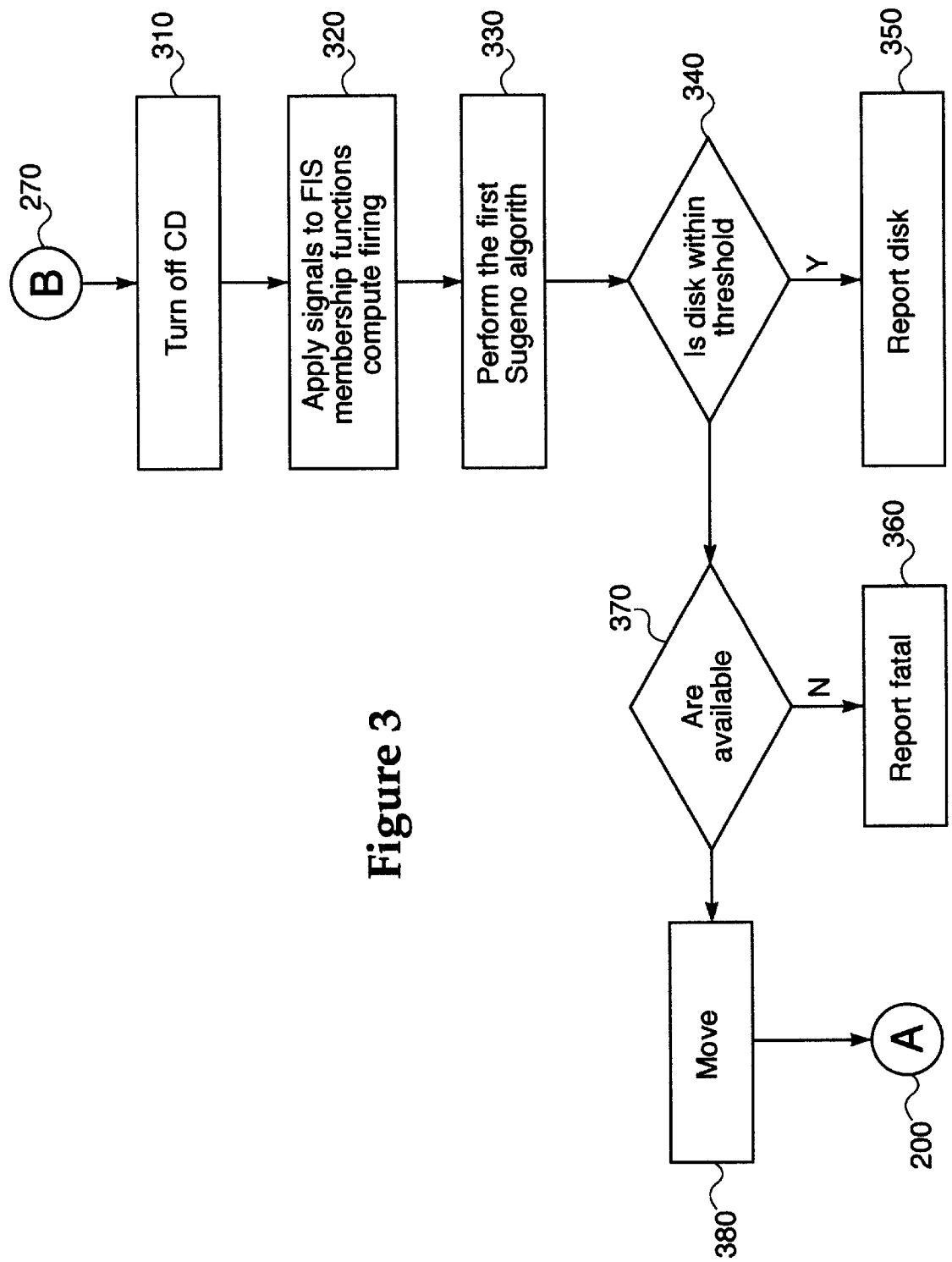
FIG. 3 is a block diagram of a second portion of the disc determination algorithm of the present invention.

Referring now to FIG. 3, processing from point B 270 proceeds to step 310 where the CD laser is turned off. The measured signals for both CD and DVD lasers from step 250 of FIG. 2 are then applied to Fuzzy Inference System (FIS) membership functions (described below in connection with FIGS. 4 and 5) to compute firing of nodes in the neural network.

The heart of the disc determination algorithm is a first-order Sugeno Fuzzy Inference System (FIS) performed in step 330. The preferred embodiment of the present invention utilizes a first-order Sugeno-type Fuzzy Inference System (FIS) as such a system may require fewer system resources to implement than, for example, a Mamdani-type FIS. However, a Mamdani-type FIS may also be implemented without departing from the spirit and scope of the present invention.

The Sugeno FIS uses several relationships between the focus error and quad sum signal properties for both the CD and DVD lasers to determine disc type. The output of the FIS is a value corresponding to a disc type. If the FIS output is a weak inference (gives an unclear choice), as determined in step 340 by comparing the output to a predetermined threshold, the algorithm may be retried up to three times at different radial positions by passing processing to step 370.

In step 370, if additional radial positions are available processing passes to step 380. If all available radial positions (e.g., three, although other numbers may be used) have been tried, a fatal detection error (e.g., disc type not identified) may be reported in step 360. In step 380, the DVD and CD laser heads may be repositioned to a different radial position on the laser disc and processing passed to point A 270 of FIG. 2 to accumulate more DVD and CD laser data.

If, however, the output of the Sugeno FIS algorithm is above the threshold as determined in step 340, disc type may be reported in step 350. Initial and retried FIS outputs may be used to determine the most likely disc type. Additionally, the output of a prior art layer determination algorithm, (the number of layers detected), may be used as an additional check when a two-layer DVD disc is detected.

Fuzzy Inference Systems are disclosed, for example, by Chin-Teng, Lin and Lee, C. S., *Neural Fuzzy Systems*, Prentice Hall, Inc., 1996. In standard types of neural network systems, a series of nodes may be connected together between inputs and outputs, with each node having an adjustable multiplier value. The network may be "trained" by inserting inputs of sample data (having expected output values) and adjusting the multiplier values for each node until the network is "trained" to produce a certain output from a range of inputs. Such neural networks have particular applications in image recognition and the like.

Figure 5:
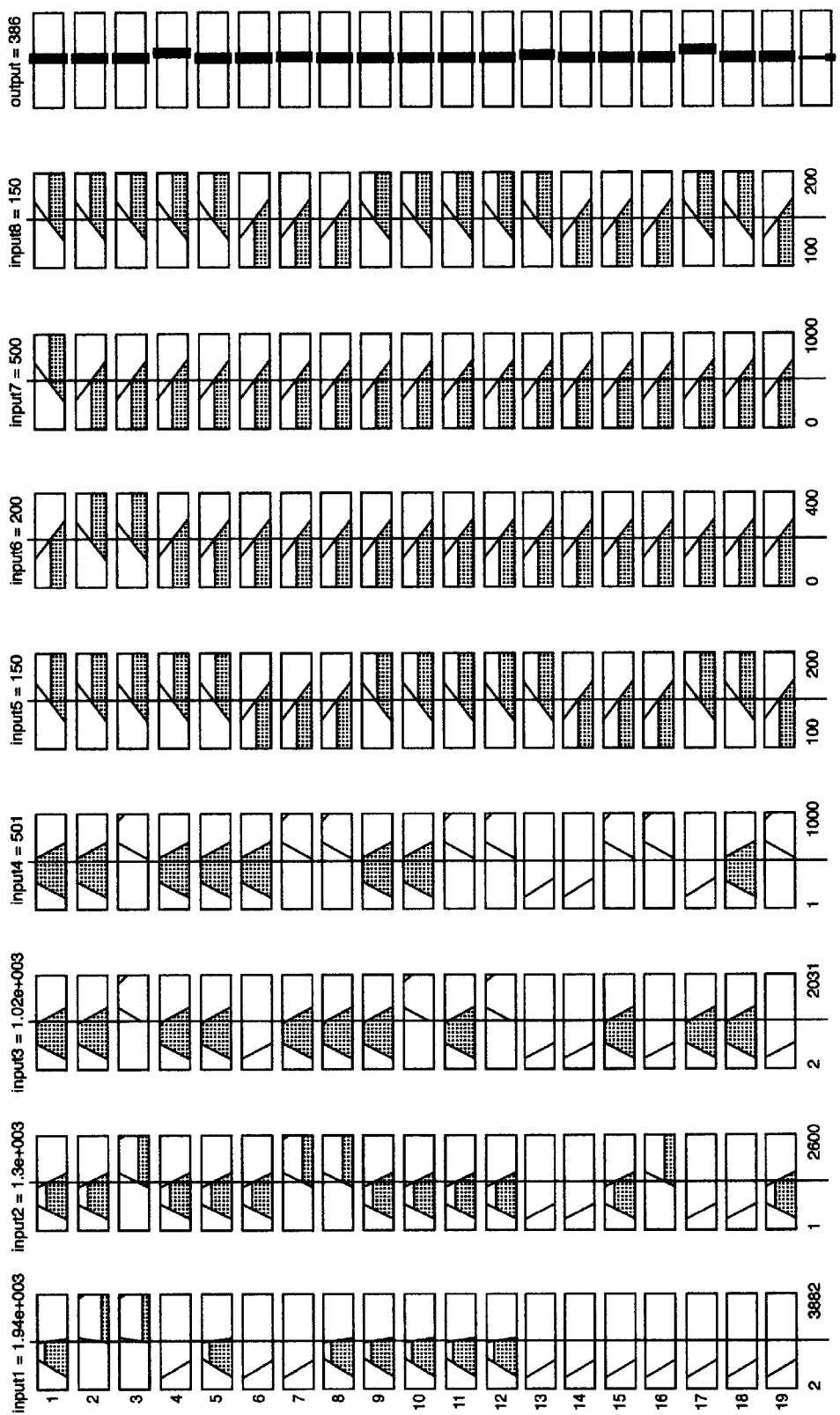
FIG. 5 is a diagram illustrating application of the rules of the FIS to a sample input to produce an output value.

A first order Sugeno system, however, may be more sophisticated than typical standard neural networks. Instead of simple multipliers at each node, a series of "rules" may be applied, these rules being honed and refined through training as in a conventional neural network. FIG. 5 is a diagram illustrating application of these rules to a sample input, as will be discussed in more detail below.

The system of the present invention uses several relationships between the focus error and quad sum signal properties for both the CD and DVD lasers to determine disc type. The signal properties and their relationships may be determined by collecting data from the photo detector outputs and using a FIS Neural Network Classifier.

Figure 4:
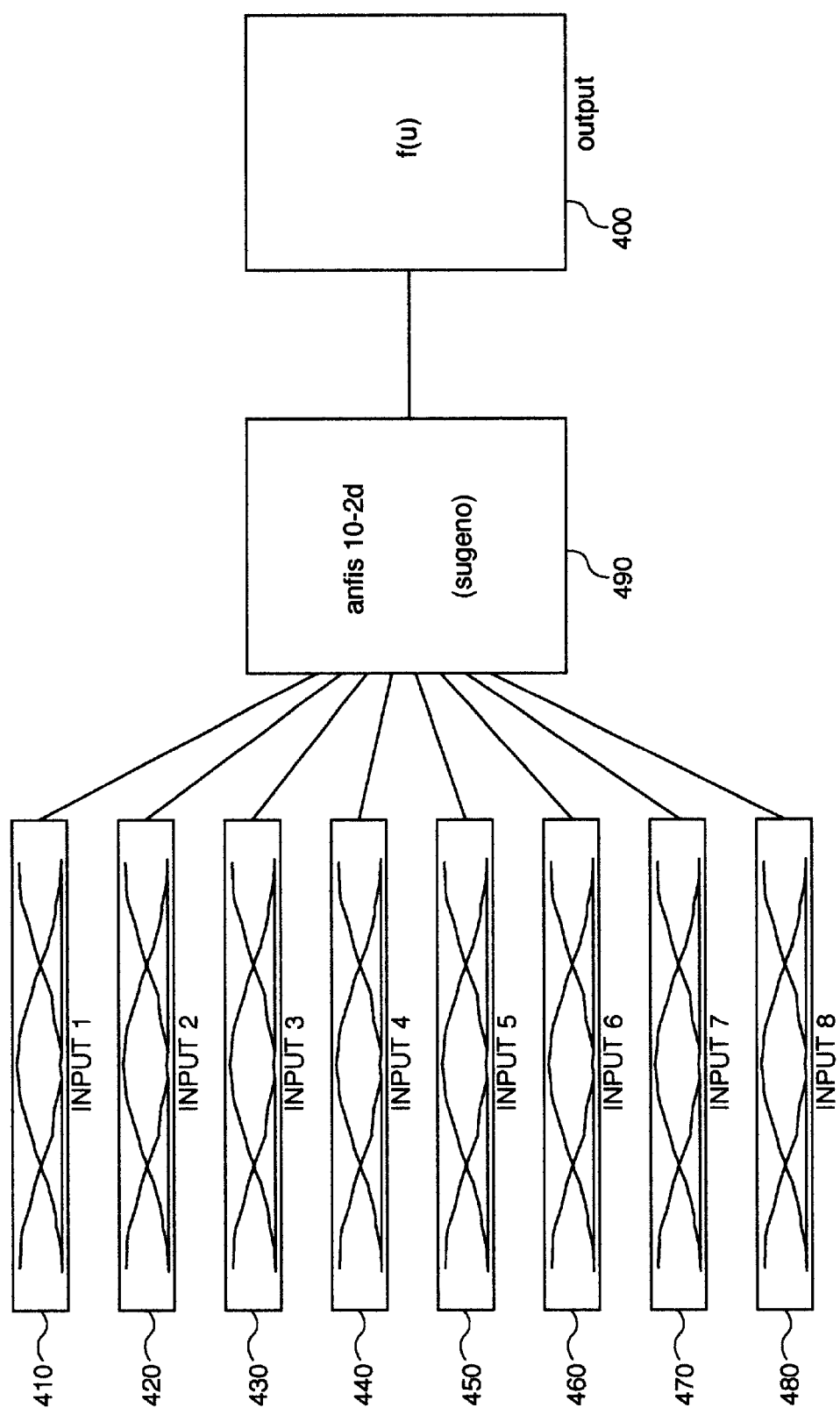
FIG. 4 is a block diagram of the Sugeno FIS of the present invention where eight inputs are applied to a Sugeno Fuzzy Inference System (FIS) to produce an output value.

The FIS of the present invention may be provided with eight inputs and one output. The one output being a value corresponding to a disc type. FIS inputs may comprise:

1. Focus_error_dvd—a focus error data value from step 250 acquired with the DVD laser on;
2. Focus_error_cd—a focus error data value from step 250 acquired with the CD laser on;
3. Quad_sum_dvd—a quad sum data value from step 250 acquired with the DVD laser on;
4. Quad_sum_cd—a quad sum data value from step 250 acquired with the CD laser on;
5. Focus_error_dvd/Quad_sum_dvd (ratio);
6. Focus_error_cd/Quad_sum_cd (ratio);
7. Focus_error_dvd/Focus_error_cd (ratio); and
8. Quad_sum_dvd/Quad_sum_cd (ratio);

FIG. 4 illustrates these eight inputs 410, 420, 430, 440, 450, 460 470, and 480 being applied to a Sugeno Fuzzy Inference System (FIS) 490 to produce an output value 400. The input membership functions, illustrated in FIG. 5, may be trapezoidal due to their ease of coding (see Appendix) and low computational overhead for today's microcontrollers. Other types of input membership functions may also be used without departing from the spirit and scope of the present invention, including, but not limited to, triangular, gaussian, bell curve, and the like.

For each input 410, 420, 430, 440, 450, 460, 470, and 480, there may be, for example, three trapezoidal membership functions (MF). These MFs map the crisp input to a fuzzy input (linguistic) value of low, medium or high. The rule base for this discriminator may be comprised of nineteen rules (as illustrated in FIG. 5) and may have equal weighting. Other numbers of rules (e.g., 21) may be applied without departing from the spirit and scope of the present invention. The defuzzification process may be implemented by first order Sugeno model.

FIG. 5 illustrates an example of sample data being input into the nineteen rules of the Sugeno FIS of the present invention. In FIG. 5, each of the first eight columns represents one of the eight inputs to the Sugeno FIS system of FIG. 4. Specific input values for this example data are labeled at the top of each column. The nineteen rules are represented by the nineteen rows of rule graphs, labeled 1 through 19 in FIG. 5. The far right column represents the output of each rule, and the lower left hand corner graph represents the averaged value of these outputs, which is the ultimate single output of the Sugeno FIS system.

In the Example of FIG. 5, each input value is applied to the trapezoidal function or Rule. The output or firing value from each rule may be represented by the area (shaded portion) of each trapezoid intersected by the input value. Thus, the rule functions have an integrating effect. If the input value does not intersect the trapezoidal function, the firing output from that node would be null. As illustrated at the far right column of FIG. 5, each of these firing values may then be summed to produce a summed value.

The actual values output by the Sugeno FIS are relatively arbitrary. In the example of FIG. 5, the output is 386, which, in one embodiment of the present invention, would identify the disc type as an audio CD or CD-ROM. The arbitrary ranges chosen for the various disc types in one embodiment of the present invention may be as follows:

| Range | Center Value | Disc Type |
| --- | --- | --- |
| <100 | N/A | No Disc Present |
| 100–300 | 200 | CD-RW |
| 300–500 | 400 | Audio CD or CD-ROM |
| 500–700 | 600 | CD-R |
| 700–900 | 800 | Single Layer DVD |
| 900–1100 | 900 | Double Layer DVD |

Note that the rages shown above do not necessarily imply that any discrimination value falling within those ranges will automatically be considered an indication of disc type. A threshold value may be used (e.g., ±30, ±50 from the center value) as being an acceptable identification range for each disc type. Discrimination values falling outside the threshold range may be termed indeterminate. As illustrated in FIG. 3, three or more additional focus loops may be performed at different locations in an attempt to provide a discrimination value within an acceptable threshold range.

Again, these overall output range values chosen are rather arbitrary (e.g., a range of 0 to 100 or 0 to 10,000 or some other range could also be used). The nineteen trapezoidal rules illustrated in FIG. 5 were developed by training the system using a variety of disc types in a variety of makes and models of disc dives (and samples thereof, to account for physical variations in both electronics and discs themselves). This training data (rules) may then be programmed into a production device to identify disc types.

One advantage of neural networks in general and the present invention in particular, is that the trapezoidal rules can be retrained as new disc types are introduced or for different drive manufacturers (to account for different physical characteristics) Thus, one single semiconductor product design may be optimized for incorporation into a variety of physical drive types and moreover be updated without a radical redesign.

In order to demonstrate the robustness of the FIS discriminator, a test was performed which compared a conventional discriminator with the FIS discriminator with and without artificial noise added to the photo detector outputs. The results of this test are illustrated in FIG. 6. As illustrated in FIG. 6, the Sugeno FIS of the present invention correctly identified disc type in all instances, with and without noise, whereas conventional devices were accurate as low as 86% of the time.

Unlike the prior art disc discrimination implementations which use if-then-else statements with fixed thresholds, the FIS discriminator's classification function is performed not on the basis of a mass of numbers but by elicitation of relationships between the classes and linguistic values attached to the object (optical media) for recognition. This feature allows the discriminator to be less sensitive to signal and media noise.

While the preferred embodiment and various alternative embodiments of the invention have been disclosed and described in detail herein, it may be apparent to those skilled in the art that various changes in form and detail may be made therein without departing from the spirit and scope thereof.

```
/*******************************************************************
    Macros and definitions
 *******************************************************************/
#define INPUT_N 8
#define RULE_N 19
#define OUTPUT_MF_N 19
#define no_rule_fired 0
#define no_disk 1
#define cdrw 2
#define cdrom 3
#define cdr 4
#define dvd1 5
#define dvd2 6
#define no_winner 7
/*******************************************************************/
/* The following values are generated using an anfis algorithm */
/*******************************************************************/
const double input_mf_para[4] [3] [4] = {{{-1146, -490, 493.999196032708,
1149.99890134274},
                                         {493.999406962713, 1149.99919603271,
1900, 2100},
                                         {1900, 2100, 3774, 4430}},
                                        {{-633.9, -271.1,
273.100007151809, 635.900002898539},
                                         {273.100017604829,
635.900007151809, 1180.09998568667, 1542.89999643798},
                                         {1180.09994294761,
1542.89998568667, 2487.1, 3049.9}},
                                        {{-533.15, -227.35,
231.35000848488, 537.150021604602},
                                         {231.350003298591,
537.15000848488, 995.854056434944, 1301.6526619255},
                                         {995.856109551319,
1301.65405643494, 1860.35, 2366.15}},
                                        {{-287.75, -122.75,
124.75001572531, 289.750014882586},
                                         {124.750016488807,
289.750015725311, 537.248700912077, 702.24619915358},
                                         {537.248586020294,
702.248700912077, 949.75, 1114.75}}};
const double input_mf_para4[4] [2] [4] = {{{30, 70, 130, 170},{130, 170, 230,
270}},
                                         {{-280, -120, 120, 280},{120, 280, 520,
680}},
                                         {{-700, -300, 300, 700},{300, 700,
1300, 1700}},
                                         {{30, 70, 130, 170},{130, 170, 230,
```

```
270}}};
const int rule_list[19] [9]={
{2, 2, 2, 2, 2, 1, 2, 2, 1},
{3, 2, 2, 2, 2, 2, 1, 2, 2},
{3, 3, 3, 3, 2, 2, 1, 2, 3},
{1, 2, 2, 2, 2, 1, 1, 2, 4},
{2, 2, 2, 2, 2, 1, 1, 2, 5},
{1, 2, 1, 2, 1, 1, 1, 1, 6},
{1, 3, 2, 3, 1, 1, 1, 1, 7},
{2, 3, 2, 3, 1, 1, 1, 1, 8},
{2, 2, 2, 2, 2, 1, 1, 2, 9},
{2, 2, 3, 2, 2, 1, 1, 2, 10},
{2, 2, 2, 3, 2, 1, 1, 2, 11},
{2, 2, 3, 3, 2, 1, 1, 2, 12},
{1, 1, 1, 1, 2, 1, 1, 2, 13},
{1, 1, 1, 1, 1, 1, 1, 1, 14},
{1, 2, 2, 3, 1, 1, 1, 1, 15},
{1, 3, 1, 3, 1, 1, 1, 1, 16}
{1, 1, 2, 1, 2, 1, 1, 2, 17},
{1, 1, 2, 2, 2, 1, 1, 2, 18},
{1, 2, 1, 3, 1, 1, 1, 1, 19}};
const double sugeno_coef[19] [9]={
{0.000403357355478442, −0.000103663549456361, −0.00128089469214146,
0.000731104432285404, 0.185188220456312, 0, 0.925922500518417,
0.185216277095809, 0.000925791796817066},
{−0.000735249971645598, 0.0751309894772361, −0.0250719492651908, −
0.0208591547600644, 0.62049275367093, 1.24096775156238, 0, 0.620479751153599,
0.00310218427145073},
{0.000503427358649318, −4.76420951639772e − 005, 0.00034971169296975, −
0.00100076889619511, 0.665693713778967, 1.33138506311786, 0, 0.665690369801862,
0.00332851727891514},
{−2.35847591819357, −1.38980066484493, 3.26833107583361, −0.905773299343391,
4.2271748232853, 0, 0, 4.22717549165789, 0.0211358751490583},
{−0.038385075464299, 0.056302770189983, 0.215207640936596, −0.0836291872266013,
0.666683134311776, 0, 0, 0.666684557409147, 0.00333343835479949},
{−0.0304109331432683, −0.000245322720357889, 0.0411212572839297, −
0.0023913264348695, 3.01167530950871, 0, 0, 3.01168380129154,
0.0301167060494287},
{0.556792222693608, 0.0112228694757386, −0.0198058238199681, −
0.123443577850065, 2.13427417867397, 0, 0, 2.13427289291553,
0.0213426993304008},
{0.592050938097423, −0.0157975149823422, 0.0409469392585855, 0.110064093169313,
−0.816914561438982, 0, 0, −0.816916289383624, −0.00816908972421055},
{−0.0383755597755452, 0.0563192424611545, 0.215210508768407, −
0.0836136437593445, 0.666683830518679, 0, 0, 0.666683082911329,
0.00333344561309823},
{−0.139429864423636, 0.147252081411653, 2.03163021172865, 0.549188795053059, −
5.5467495622554, 0, 0, −5.54675203327879, −0.0277337422043185},
{0.190115659072646, −0.271131440265511, −0.155503617628494, 0.721899724780252,
0.173233137120382, 0, 0, 0.173232136898585, 0.000866191420924979},
{−0.216940140657871, 0.219653723336937, 0.47299708785462, −0.363003144977965,
0.52085193670441, 0, 0, 0.520851145771461, 0.00260423500158277},
{0.16776771234007, −0.668464748062404, 1.36529775243449, 0.538104762657906, −
0.093768712598523, 0, 0, −0.0937684933657835, −0.000468839309786207},
{0, 0, 0, 0, 0, 0, 0, 0, 0},
{0.00145901902121875, 0.000145598437305723, −0.000302027267982452, −
0.00504016775211014, 3.01022420919385, 0, 0, 3.01022431719119,
0.0301022627761879},
{0.111226236543732, −0.00354191128104331, −0.197891227277575,
0.233416455780896, 2.12679385406052, 0, 0, 2.12678380265303,
0.0212679345546509},
{−0.40737916418022, 2.31604442975575, 4.02939630096619, −3.50413037243463, −
3.61993432466054, 0, 0, −3.61993469258714, −0.0180996583519133},
{0.766810132918252, −5.3587463248902, −3.52949440267208, 6.48111016655996,
3.61337797582972, 0, 0, 3.61337700259837, 0.0180668775714956},
{0.0048034229451821, 0.0022054898351539; −0.00601797125020154, −
0.00594418557663112, 3.01019395196292, 0, 0, 3.0101949071217,
0.0301019610142096}};
/*************************************************** */
/* This First Order Sugeno FIS is anfis optimized to perform the optical    */
/* disk determination function.                                             */
/* Inputs: fe_dvd, fe_cd, qs_dvd, qs_cs                                     */
/* Output: A value from 0 through 1000 encodes the disk type                */
/*                                                                          */
/* Author: Lou Supino 9/05/2000                                             */
/*************************************************** */
#ifndef _FIS_
#define _FIS_
#include <string.h>
```

-continued

```
#include "sv_fuzzy.h"
#ifndef NO_PRINTF
  #include <stdio.h>
#endif
/**********************************************************************
 Functions for the Fuzzy Inference System
 **********************************************************************/
/**********************************************************************
 Parameterized membership functions
 **********************************************************************/
/* Trapezpoidal membership function */
static double fisTrapezoidMf(double x, double *para)
}
    double a = para[0], b = para[1], c = para[2], d = para[3];
    double y1 = 0, y2 = 0;
    if (b <= x)
        y1 = 1;
    else if (x < a)
        y1 = 0;
    else if (a != b)
        y1 = (x-a)/(b-a);
    if (x <= c)
        y2 = 1;
    else if (d < x)
        y2 = 0;
    else if (c != d)
        y2 = (d-x)/(d-c);
  return(((y1) < (y2) ? (y1) : (y2)));
}
static double fisProd(double x, double y)
{return(x*y);}
/**********************************************************************
 Main routine
 **********************************************************************/
double *input_value;
double firing_strength[RULE_N];
double out,accum;
double total_w;
double *ptr_temp;
int discriminate(double *input_value)
{
    int i,j, k;
    /* Generate the FIS inputs */
 if ((input_value[4]==input_value[5])&&(input_value[4]==1))
        input_value[6]=0;
    else if((input_value[4]>1)&&(input_value[5]>1))
        input_value[6]=1000;
    else
        input_value[6]=0;
 if(input_value[1]<input_value[0])
        input_value[7]=200;
    else{
        input_value[7]=100;
            input_value[6]=0;
    }
    if(input_value[3]<input_value[2])
        input_value[4]=200;
    else
        input_value[4]=100;
 if (input_value[0]>2100)
        input_value[5]=400;
    else
        input_value[5]=0;
/**********************************************************************
    /* Compute firing strengths of the rule input elements via andFcn  */
    /*                                                                 */
/*              rule n-1                                               */
    /* total_wf = sum[firing_strength(i)*rule_output_value(i)]         */
    /*              i=0                                                */
/**********************************************************************/
    for (i = 0; i < RULE_N; i++) {
                for (j = 0; j < INPUT_N; j++)
                    k = rule_list[i] [j];
                    if (j<4)
                      ptr_temp=&input_mf_para[j] [k-1] [0];
                    else
                      ptr_temp=&input_mf_para4[j-4] [k-1] [0]; /* WATCH j-4
*/
                    if (k > 0)
```

```
                    accum = fisTrapezoidMf(input_value[j], ptr_temp);
                else if (k == 0) /* Don't care */
                    accum = 1;
                else         /* Linguistic hedge NOT */
                    accum = 1-fisTrapezoidMf(input_value[j],
ptr_temp);
                if (j == 0) {
                    firing_strength[i] = accum;
                }
                else {
                 firing_strength[i]=fisProd(firing_strength[i],accum);
                }
            }
        }
    }
/*****************************************************************
*********/
/* the FIS system is a First Order Sugeno, with 1 output
*/
/* NOTE: THIS ALGORITHM ASSUMES THE NUMBER OF RULES = THE NUMBER OF OUTPUT
OUTPUT MFs */
/* Just computes the mf_output node values and sum the firing strengths
*/
/*****************************************************************
*********/
            total_w=0;
            out=0;
            for (j = 0; j < OUTPUT_MF_N; j++) {
                accum = 0;
                for (k = 0; k < INPUT_N; k++)
                    accum += (input_value[k])*(sugeno_coef[j] [k]);
                accum += sugeno_coef[j] [INPUT_N];
                out += (firing_strength[j]* accum);
                total_w += firing_strength[j];
            }
            out = out/total_w;
/*          printf("out=%f\n",out);  */
        /*************************************************************  */
        /* Decode value into disk type.                                  */
        /* The algorithm assumes that the output space range is [0:1000+] */
        /*                                                               */
        /*************************************************************/
if(total_w==0)
    return(no_winner);   /* this means that no rules fired */
if(out< (100)) {
#ifndef NO_PRINTF
        printf("no disk \n");
#endif
      if(input_value[0]>200)
         return(no_winner);
      else
            return(no disk);
}
    else if((out < 300)&&(out > 100)) {
#ifndef NO_PRINTF
    printf("cdrw \n");
#endif
 /*     if(input_value[5]==400)
            return(dvd1);
         else if((input_value[0]>1000))
            return(no winner);
         else                            */
            return(cdrw);
    }
    else if((out < 500)&&(out > 300)&&(input_value[4]==200)) {
#ifndef NO_PRINTF
    printf("cdrom \n");
    #endif
/*      if(input_value[5]==400)
            return(dvd1);
         else                     */
            return(cdrom);
    }
    else if(((out < 700)&&(out > 500))||(input_value[4]==100)) {
#ifndef NO_PRINTF
      printf ("cdr \n");
#endif
/*        if(input_value[5]==400)
            return(dvd1);
         else if((input_value[0]>input_value[1])&&(input_value[6]==1000))
```

```
                return(dvd2);
            else if(input_value[0]>input_value[1])
                return(no_winner);
            else                        */
                return(cdr);
        }
        else if((out < 900)&&(out > 700)) {
#ifndef NO_PRINTF
            printf("dvd1 \n");
#endif
            if((input_value[5]==0)&&(input_value[6]==1000))
                return(dvd2);
            else
                return(dvd1);
        }
        else if(out > 900) {
#ifndef NO_PRINTF
            printf("dvd2 \n");
#endif
  /*       if((input_value[4]==100)||(input_value[7]==100))
                return(cdr);
            else if((input_value[5]==400)&&(input_value[6]==0))
                return(dvd1);
            else if ((input_value[6]==1000)&&(input_value[5]==0)) */
                return(dvd2);
  /*         else
                return(no winner);     */
        }
        else {
#ifndef NO_PRINTF
            printf("no clear winner \n");
#endif
            return(no_winner);
        }
}
```

We claim:

1. An apparatus for distinguishing among optical disc types, the apparatus comprising:
   first means for measuring a plurality of optical disc drive parameters;
   second means, coupled to the first means for receiving the optical disc drive parameters and generating a plurality of inputs; and
   a Fuzzy Inference System (FIS) coupled to the second means, for receiving the plurality of inputs, applying the plurality of inputs to the FIS, and outputting a discrimination value,
   wherein a range of the discrimination value corresponds to an optical disc type.

2. The apparatus of claim 1, wherein the optical disc types include one or more of double-layer DVD, single-layer DVD, CD-ROM/CD-Audio, CD-R, CD-RW, and no disc present.

3. The apparatus of claim 1, wherein the plurality of disc drive parameters represent physical properties of the reflecting layer of an optical disc.

4. The apparatus of claim 3, wherein said plurality of disc drive parameters are generated from at least one of DVD laser and CD laser photo diode outputs.

5. The apparatus of claim 4, wherein the DVD laser and CD laser photo diode outputs include at least one of focus error and quad sum data.

6. The apparatus of claim 1, wherein the plurality of inputs comprises inputs derived from focus error and quad sum data from DVD laser and CD laser photo diode outputs.

7. The apparatus of claim 6, wherein the FIS comprises a Sugeno FIS outputting a value corresponding to drive type.

8. The apparatus of claim 7, wherein the optical disc drive comprises a DVD player.

9. The apparatus of claim 8, wherein said first means for measuring a plurality of optical disc drive parameters further comprises:
   means for setting initial hardware and software gains for laser focus loop;
   means for activating the DVD laser;
   means for commanding a servo control system to perform several open loop calibrations as a focus acquire process.

10. The apparatus of claim 9, wherein said first means for measuring a plurality of optical disc drive parameters further comprises:
    means for measuring DVD laser focus error;
    means for measuring DVD laser quad sum signal data; and
    means for averaging and saving focus error and quad sum signals.

11. The apparatus of claim 10, wherein said first means for measuring a plurality of optical disc drive parameters further comprises:
    means for activating a CD laser activated;
    means for resetting photo detector amplifier gains to CD laser values; and
    means for commanding a servo control system to perform several open loop calibrations as a focus acquire process.

12. The apparatus of claim 11, wherein said first means for measuring a plurality of optical disc drive parameters further comprises:
    means for measuring CD laser focus error;
    means for measuring CD laser quad sum signal data; and
    means for averaging and saving focus error and quad sum signals.

13. The apparatus of claim 12, wherein said second means, coupled to the first means for receiving the optical disc drive parameters and generating a plurality of inputs further generates eight inputs comprising:
- (a) Focus_error_dvd comprising a DVD laser focus error data value from the means for measuring DVD focus error;
- (b) Focus_error_cd comprising a CD laser a focus error data value from the means for measuring CD focus error;
- (c) Quad_sum_dvd comprising a DVD laser quad sum data value from the means for measuring DVD laser quad sum signal data;
- (d) Quad_sum_cd comprising a CD laser quad sum data value from the means for measuring CD laser quad sum signal data;
- (e) Focus_error_dvd/Quad_sum_dvd;
- (f) Focus_error_cd/Quad_sum_cd;
- (g) Focus_error_dvd/Focus_error_cd; and
- (h) Quad_sum_dvd/Quad_sum_cd.

14. The apparatus of claim 13, wherein said Fuzzy Inference System (FIS) coupled to the second means, for receiving the plurality of inputs, applying the plurality of inputs to the FIS, and outputting a discrimination value, receives the eight inputs to compute firing of nodes in the neural network.

15. The apparatus of claim 14, wherein the FIS comprises a first-order Sugeno Fuzzy Inference System.

16. The apparatus of claim 15, wherein the first order Sugeno system comprises a predetermined number of rules to be applied at each node in the FIS, each of the rules being developed by training the FIS on sample discs.

17. The apparatus of claim 16, wherein the rules comprise trapezoidal membership functions.

18. The apparatus of claim 17, wherein each of the rules comprises three trapezoidal membership functions mapping at least one of the eight input values to a fuzzy input value of low, medium or high.

19. The apparatus of claim 18, wherein the rules comprise a rule base of nineteen rules for each of the eight inputs having equal weighting.

20. The apparatus of claim 19, wherein each the output of each of the nineteen rules for each of the eight inputs is summed to produce nineteen intermediate output values.

21. The apparatus of claim 20, wherein each of nineteen intermediate output values is summed to produce a single discrimination value having a range corresponding to an optical disc type.

22. The apparatus of claim 21, wherein the FIS discrimination value is compared to a predetermined threshold range, and if the FIS output discrimination value is outside the predetermined threshold range, the discrimination value is considered a weak inference.

23. The apparatus of claim 22, wherein if the FIS generates a weak inference, the first means for measuring a plurality of optical disc drive parameters and the second means, coupled to the first means for receiving the optical disc drive parameters and generating a plurality of inputs are retried a predetermined number of times at different radial positions of the optical disc to generate inputs for the FIS.

24. The apparatus of claim 23, wherein if, after the predetermined number of times of retries, the FIS still produces a weak inference, a detection error is generated.

25. A method for distinguishing among optical disc types, the method comprising the steps of:
- measuring a plurality of optical disc drive parameters,
- receiving the optical disc drive parameters and generating a plurality of inputs, and
- receiving, in a Fuzzy Inference System (FIS), the plurality of inputs, applying the plurality of inputs to the FIS, and outputting a discrimination value,
- wherein a range of the discrimination value corresponds to an optical disc type.

26. The method of claim 25, wherein the optical disc types include one or more of double-layer DVD, single-layer DVD, CD-ROM/CD-Audio, CD-R, CD-RW, and no disc present.

27. The method of claim 25, wherein the plurality of disc drive parameters represent physical properties of the reflecting layer of an optical disc.

28. The method of claim 27, wherein the plurality of disc drive parameters are generated from at least one of DVD laser and CD laser photo diode outputs.

29. The method of claim 28, wherein the DVD laser and CD laser photo diode outputs include at least one of focus error and quad sum data.

30. The method of claim 25, wherein the plurality of inputs comprises inputs derived from focus error and quad sum data from DVD laser and CD laser photo diode outputs.

31. The method of claim 30, wherein the FIS comprises a Sugeno FIS outputting a value corresponding to drive type.

32. The method of claim 31, wherein the optical disc drive comprises a DVD player.

33. The method of claim 32, wherein the step of measuring a plurality of optical disc drive parameters further comprises the steps of:
- setting initial hardware and software gains for laser focus loop,
- activating the DVD laser,
- commanding a servo control system to perform several open loop calibrations as a focus acquire process.

34. The method of claim 33, wherein the step of measuring a plurality of optical disc drive parameters further comprises the steps of:
- measuring DVD laser focus error,
- measuring DVD laser quad sum signal data, and
- averaging and saving focus error and quad sum signals.

35. The method of claim 34, wherein the step of said measuring a plurality of optical disc drive parameters further comprises the steps of:
- activating a CD laser activated,
- resetting photo detector amplifier gains to CD laser values, and
- commanding a servo control system to perform several open loop calibrations as a focus acquire process.

36. The method of claim 35, wherein the step of measuring a plurality of optical disc drive parameters further comprises the steps of:
- measuring CD laser focus error,
- measuring CD laser quad sum signal data, and
- averaging and saving focus error and quad sum signals.

37. The method of claim 36, wherein the step of receiving the optical disc drive parameters and generating a plurality of inputs further comprises the steps of generating eight inputs comprising:
- (a) Focus_error_dvd comprising DVD laser focus error data, (b) Focus_error_cd comprising a CD laser focus error data, (c) Quad_sum_dvd comprising a DVD laser quad sum data value,
- (d) Quad_sum_cd comprising a CD laser quad sum data value, (e) Focus_error_dvd/Quad_sum_dvd,
(f) Focus_error_cd/Quad_sum_cd,
(g) Focus_error_dvd/Focus_error_cd, and
(h) Quad_sum_dvd/Quad_sum_cd.

38. The method of claim 37, further comprising the step of receiving, in the Fuzzy Inference System (FIS), the eight inputs to compute firing of nodes in the neural network.

39. The method of claim 38, wherein the FIS comprises a first-order Sugeno Fuzzy Inference System.

40. The method of claim 39, wherein the steps of receiving, in a Fuzzy Inference System (FIS), the plurality of inputs, applying the plurality of inputs to the FIS, and outputting a discrimination value, further comprises the step of:
applying the plurality of inputs to a predetermined number of rules at each node in the FIS, each of the rules being developed by train ing the FIS on sample discs.

41. The method of claim 40, wherein the rules comprise trapezoidal membership functions.

42. The method of claim 41, wherein each of the rules comprises three trapezoidal membership functions mapping at least one of the eight input values to a fuzzy input value of low, medium or high.

43. The method of claim 42, wherein the rules comprise a rule base of nineteen rules for each of the eight inputs having equal weighting.

44. The method of claim 43, further comprising the step of summing each output of each of the nineteen rules for each of the eight inputs to produce nineteen intermediate output values.

45. The method of claim 44, further comprising the step of summing each of the nineteen intermediate output values to produce a single discrimination value having a range corresponding to an optical disc type.

46. The method of claim 45, further comprising the steps of:
comparing the FIS discrimination value to a predetermined threshold range, and
if the FIS output discrimination value is outside the predetermined threshold range, considering the discrimination value a weak inference.

47. The method of claim 46, further comprising the steps of:
if the FIS generates a weak inference, retrying the steps of measuring a plurality of optical disc drive parameters and receiving the optical disc drive parameters and generating a plurality of inputs a predetermined number of times at different radial positions of the optical disc to generate inputs for the FIS.

48. The method of claim 47, further comprising the steps of:
generating a detection error if, after the predetermined number of times of retries, the FIS still produces a weak inference.

49. A processor readable media containing instructions for commanding the processor to perform predetermined functions for distinguishing among optical disc types, the processor readable media comprising:
a first instruction for measuring a plurality of optical disc drive parameters;
a second instruction for receiving the optical disc drive parameters and generating a plurality of inputs; and
a set of Fuzzy Inference System (FIS) instructions, for receiving the plurality of inputs, applying the plurality of inputs to the FIS, and outputting a discrimination value,
wherein a range of the discrimination value corresponds to an optical disc type.

50. The processor readable media of claim 49, wherein the optical disc types include one or more of double-layer DVD, single-layer DVD, CD-ROM/CD-Audio, CD-R, CD-RW, and no disc present.

51. The processor readable media of claim 49, wherein the plurality of disc drive parameters represent physical properties of the reflecting layer of an optical disc.

52. The processor readable media of claim 51, wherein said plurality of disc drive parameters are generated from at least one of DVD laser and CD laser photo diode outputs.

53. The processor readable media of claim 52, wherein the DVD laser and CD laser photo diode outputs include at least one of focus error and quad sum data.

54. The processor readable media of claim 49, wherein the plurality of inputs comprises inputs derived from focus error and quad sum data from DVD laser and CD laser photo diode outputs.

55. The processor readable media of claim 54, wherein the set of FIS instructions comprises a Sugeno FIS outputting a value corresponding to drive type.

56. The processor readable media of claim 55, wherein the optical disc drive comprises a DVD player.

57. The processor readable media of claim 56, wherein said first instruction for measuring a plurality of optical disc drive parameters further comprises:
an instruction for setting initial hardware and software gains for laser focus loop;
an instruction for activating the DVD laser;
an instruction for commanding a servo control system to perform several open loop calibrations as a focus acquire process.

58. The processor readable media of claim 57, wherein said first instruction for measuring a plurality of optical disc drive parameters further comprises:
an instruction for measuring DVD laser focus error;
an instruction for measuring DVD laser quad sum signal data; and
an instruction for averaging and saving focus error and quad sum signals.

59. The processor readable media of claim 58, wherein said first instruction for measuring a plurality of optical disc drive parameters further comprises:
an instruction for activating a CD laser activated;
an instruction for resetting photo detector amplifier gains to CD laser values; and
an instruction for commanding a servo control system to perform several open loop calibrations as a focus acquire process.

60. The processor readable media of claim 59, wherein said first instruction for measuring a plurality of optical disc drive parameters further comprises:
an instruction for measuring CD laser focus error;
an instruction for measuring CD laser quad sum signal data; and
an instruction for averaging and saving focus error and quad sum signals.

61. The processor readable media of claim 60, wherein said second instruction for receiving the optical disc drive parameters and generating a plurality of inputs further generates eight inputs comprising:
(a) Focus_error_dvd comprising a DVD laser focus error data value from the instruction for measuring DVD focus error;

(b) Focus_error_cd comprising a CD laser a focus error data value from the instruction for measuring CD focus error;
(c) Quad_sum_dvd comprising a DVD laser quad sum data value from the instruction for measuring DVD laser quad sum signal data;
(d) Quad_sum_cd comprising a CD laser quad sum data value from the instruction for measuring CD laser quad sum signal data;
(e) Focus_error_dvd/Quad_sum_dvd;
(f) Focus_error_cd/Quad_sum_cd;
(g) Focus_error_dvd/Focus_error_cd; and
(h) Quad_sum_dvd/Quad_sum_cd.

62. The processor readable media of claim 61, wherein said set of Fuzzy Inference System (FIS) instructions for receiving the plurality of inputs, applying the plurality of inputs to the FIS, and outputting a discrimination value, receives the eight inputs to compute firing of nodes in the neural network.

63. The processor readable media of claim 62, wherein the set of FIS instructions comprises a first-order Sugeno Fuzzy Inference System.

64. The processor readable media of claim 63, wherein the set of instructions comprising a first order Sugeno system comprises a predetermined number of rule instructions to be applied at each node in the FIS, each of the rules being developed by training the FIS on sample discs.

65. The processor readable media of claim 64, wherein the rule instructions comprise trapezoidal membership functions.

66. The processor readable media of claim 65, wherein each of the rule instructions comprises three trapezoidal membership functions mapping at least one of the eight input values to a fuzzy input value of low, medium or high.

67. The processor readable media of claim 66, wherein the rule instructions comprise a rule base of nineteen rules for each of the eight inputs having equal weighting.

68. The processor readable media of claim 67, wherein each the output of each of the nineteen rules for each of the eight inputs is summed to produce nineteen intermediate output values.

69. The processor readable media of claim 68, wherein each of nineteen intermediate output values is summed to produce a single discrimination value having a range corresponding to an optical disc type.

70. The processor readable media of claim 69, further comprising instructions for comparing the FIS discrimination value to a predetermined threshold range, and if the FIS output discrimination value is outside the predetermined threshold range, the discrimination value is considered a weak inference.

71. The processor readable media of claim 70, further comprising instructions for retrying, if the FIS generates a weak inference, the first instruction for measuring a plurality of optical disc drive parameters and the second instruction for receiving the optical disc drive parameters and generating a plurality of inputs a predetermined number of times at different radial positions of the optical disc to generate inputs for the FIS.

72. The processor readable media of claim 71, further comprising instructions for generating a detection error if, after the predetermined number of times of retries, the FIS still produces a weak inference.

* * * * *